E. B. PHELPS & J. P. McLEAN.
BROILER.
No. 112,846.                    Patented Mar. 21, 1871.
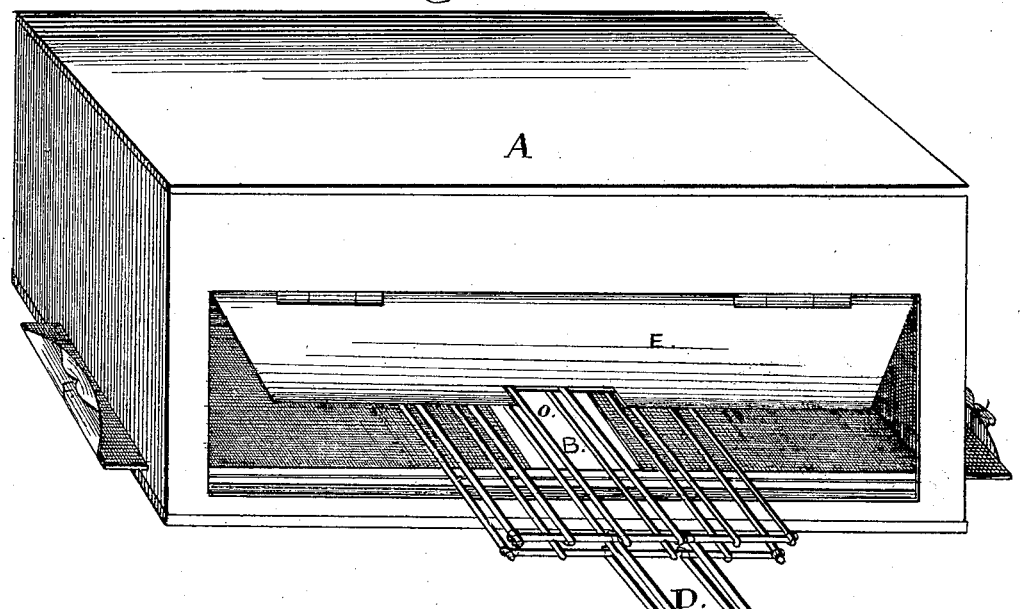
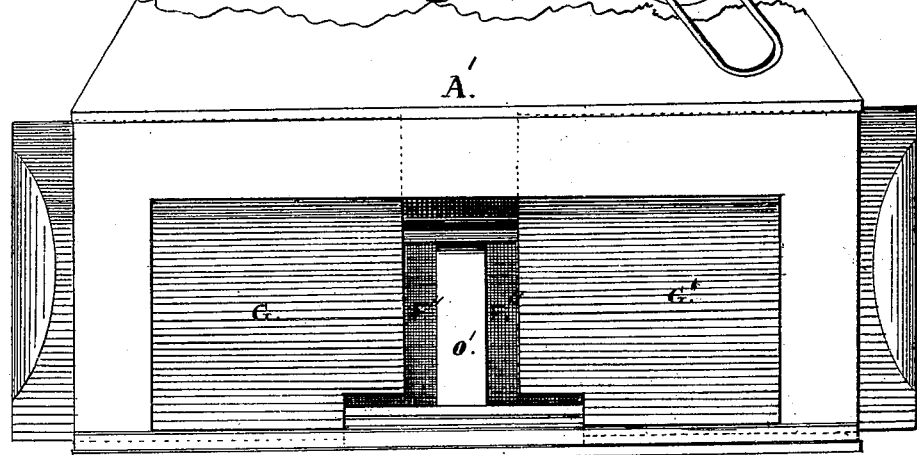

United States Patent Office.

EDWARD B. PHELPS AND JAMES P. McLEAN, OF BROOKLYN, NEW YORK.

Letters Patent No. 112,846, dated March 21, 1871.

IMPROVEMENT IN BROILERS.

The Schedule referred to in these Letters Patent and making part of the same.

*To all whom it may concern:*

Be it known that we, EDWARD B. PHELPS and JAMES P. McLEAN, of Brooklyn, in the county of Kings and State of New York, have invented a certain new and useful Improvement in Independent Covers for Broiling Apparatus; and we hereby declare in what manner the same are to be constructed; and to enable the public to understand the nature of our improved invention, and to enable those skilled in the mechanic arts to construct the same, we have prepared the following specification, with accompanying drawing, which is lettered to correspond with and form a part of the same, to wit:

Figure 1 is a perspective drawing of our improved independent cover A, having a swinging damper, E, and bottom-slide, F F', to pass under the gridiron B, so as to cut off the direct action of the fire O upon the bars of the gridiron, excepting those which support the meat to be broiled.

Figure 2 is a front elevation of our improved independent cover A', provided with horizontal slides or dampers G G' in lieu of the swinging damper E, fig. 1, if preferred, to regulate the admission of cold air into the cover during the process of broiling.

F'' F''' are the bottom cut-off slides or dampers.

O' is the fire under the meat.

We are aware that attached covers to gridirons for broiling purposes, and simple detached covers (similar to pot-covers) are in common use for covering broilers, and that attached or detached covers are employed for frying, roasting, boiling, baking, stewing, &c., in JAS. P. McLEAN's application for a patent allowed August 24, 1870. Neither of these are intended to form a part of this application; but our invention consists in the construction of an independent cover, A, provided with a swinging damper, E, or dampers G G', with or without regulating cut-offs F F'', by which means we are enabled to bring the meat in close proximity to the direct fire surface, and thereby more effectually broil and preserve the flavor of the same; therefore,

What we claim as our improved invention, and desire to secure by Letters Patent of the United States, is—

The independent cover A or A', with swinging damper E or slide-dampers G G', with or without the regulating cut-offs F F''', all constructed, arranged, and operating in the manner and for the ostensible purpose of broiling meat, &c.

In testimony whereof we hereunto subscribe our names in the presence of two witnesses.

EDWD. B. PHELPS.
JAMES P. McLEAN.

Witnesses:
J. RITCHIE McLEAN,
ANNE S. McLEAN.